United States Patent [19]

Siggel et al.

[11] 3,839,244

[45] Oct. 1, 1974

[54] FLAME-RESISTANT POLYMERIC PRODUCTS FROM POLYACYLOXALAMIDRAZONES AND VISCOSE AND THEIR MANUFACTURE

[75] Inventors: Erhard Siggel, Seckmauern; Gerhard Meyer, Obernburg; Heinz Grotjahn, Roellfeld; Helmut Maegerlein, Erlenbach; Hans-Dieter Rupp, Erlenbach; Eckart Jacobs, Erlenbach; Michael Wallrabenstein, Erlenbach, all of Germany

[73] Assignee: Akzona Incorporated, Asheville, N.C.

[22] Filed: May 14, 1973

[21] Appl. No.: 360,262

Related U.S. Application Data

[63] Continuation-in-part of Ser. No. 33,957, May 1, 1970, abandoned.

[52] U.S. Cl. ........ 260/9, 260/45.75 K, 260/45.75 R, 260/45.9 NC, 260/45.9 R, 264/188, 264/194
[51] Int. Cl. ..................... C08b 27/68, C08b 29/22, C08b 29/30, D01f 1/02, D01f 3/12
[58] Field of Search .................... 264/191, 194, 188; 260/78 TF, DIG. 24, 9, 45.75 R, 45.9 R, 45.9 NC

[56] References Cited
UNITED STATES PATENTS

| | | | |
|---|---|---|---|
| 1,902,778 | 3/1933 | Hintze | 264/211 X |
| 2,488,034 | 11/1949 | Pingree | 260/DIG. 24 |
| 2,524,625 | 10/1950 | Drisch et al. | 264/191 |
| 2,597,624 | 5/1952 | Drisch et al. | 264/191 |
| 3,359,224 | 12/1967 | Faessinger et al. | 264/188 UX |
| 3,445,556 | 5/1969 | Kuzmak et al. | 264/188 X |
| 3,455,713 | 7/1969 | Godfrey | 264/194 X |
| 3,505,087 | 4/1970 | Godfrey | 264/194 X |
| 3,544,528 | 12/1970 | Magerlein et al. | 260/78 TF |
| 3,560,452 | 2/1971 | Schulze et al. | 260/78 TF |
| 3,560,453 | 2/1971 | Schopf et al. | 260/78 TF |

FOREIGN PATENTS OR APPLICATIONS

| | | | |
|---|---|---|---|
| 43-14479 | 6/1968 | Japan | 260/78 TF |
| 460,582 | 10/1949 | Canada | 264/191 |
| 485,872 | 3/1970 | Switzerland | 260/78 TF |
| 1,102,008 | 2/1968 | Great Britain | 264/191 |

OTHER PUBLICATIONS

Saga, Motoo "Polycondensation of Oxalamidrazone with Dicarboxylic Acid Chlorides," In Journal of Polymer Science, Part B, Nov. 1966, pp. 869–873.

Shono, Toshiyuki "Poly(1,2,4-Triazoles)" In Chemical Abstracts, Vol. 69, 1968, Page 1006Z.

*Primary Examiner*—Philip E. Anderson
*Attorney, Agent, or Firm*—Francis W. Young

[57] ABSTRACT

A process for the manufacture of flame-resistant threads, fibers, and films and the like products that contain a synthetic polymer and cellulose, which comprises processing a mixture of viscose and an aqueous alkaline solution of a polyacyloxalamidraxone such as polyterephthaloyloxalamidrazone to form a thread or like product, immersing the product in a treatment bath that can be neutral acidic or alkaline in which bath it is allowed to react with a solution of one or more metal compounds, e.g., zinc chloride, tin chloride, and/or barium chloride, and thereafter washing and drying the resulting product.

10 Claims, No Drawings

FLAME-RESISTANT POLYMERIC PRODUCTS FROM POLYACYLOXALAMIDRAZONES AND VISCOSE AND THEIR MANUFACTURE

RELATED APPLICATION

This application is a continuation-in-part application of U.S. Ser. No. 33,957, filed May 1, 1970 and now abandoned.

This invention is directed to the manufacture of flame-resistant polymer products and more particularly to a process for producing flame-resistant threads, fibers, films, and the like products from a mixture of viscose and certain synthetic polymers, and to the products obtained therefrom.

The specification of U.S. Pat. No. 3,583,953 is incorporated by reference and describes the production of threads of polyacyloxalamidrazones with recurring structural units of the general formula:

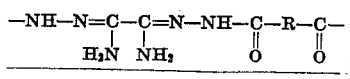

wherein R represents a straight-chain or branched, saturated or unsaturated aliphatic radical containing from 2 to 12 carbon atoms, a cycloaliphatic, araliphatic, or an aromatic (e.g., arylene) radical. These threads are not highly flame-resistant.

Advantageously, this invention provides a process for producing highly flame-resistant fibers and the like products from admixtures of such polyacyloxalamidrazones and viscose.

Thus, this invention contemplates a process for producing flame-resistant threads, fibers, films, and the like that contain a synthetic polymer as well as cellulose, which comprises processing a mixture of viscose and an aqueous alkaline solution of a polyacyloxalamidrazone of the formula:

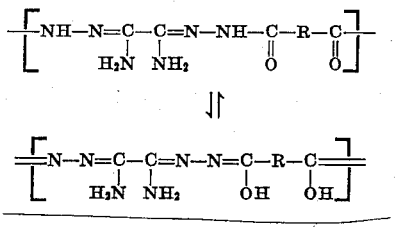

wherein R represents a straight-chain or branched, saturated, or unsaturated aliphatic radical containing 2 to 12 carbon atoms, a cycloaliphatic, araliphatic, aromatic, or heterocyclic radical containing from 4 to 12 carbon atoms, to form threads, fibers, films, and the like products, and immersing these products in treatment bath in which they are allowed to react with a solution of one or more compounds of the metals zinc, tin, cadmium, barium, strontium, calcium, antimony, and tantalum, and thereafter washing and drying the resulting products.

It will be understood that polyacyloxalamidrazones of the above-characterized type are, for instance, described in U.S. Pat. No. 3,544,528, the specification of which is incorporated by reference. These compounds are obtained by having one or more acid halides of dicarboxylic acids of the general formula:

wherein R represents a straight-chain or branched saturated or unsaturated aliphatic radical with 2 to 12 carbon atoms, a cycloaliphatic, araliphatic, aromatic radical or heterocyclic radical containing from 4 to 12 carbon atoms and X is chlorine or bromine, reacted with oxalic acid bisamidrazone.

Among the polyacyloxalamidrazones suitable for the purposes of this invention are those that contain a radical obtained by reaction of a halide of terephthalic acid, isophthalic acid, fumaric acid, 2,6-pyridinedicarboxylic acid, adipinic acid (i.e., adipic acid) or sebacic acid.

Particularly suitable are polyterephthaloyloxalamidrazone and polyfumaroyl-oxalamidrazone.

Polyacyloxalamidrazones having a reduced viscosity in the range of 0.2 to 5.4 are known. However, it is also possible to obtain polyacyloxalamidrazone having a higher molecularity.

The preparation of the dilute aqueous alkali metal hydroxide solution of polyacyloxalamidrazones can be carried out in accordance with the disclosed procedures in U.S. Pat. No. 3,583,953. In that case, a dilute aqueous solution of an alkali hydroxide is proposed as solvent for polyacyloxalamidrazone. If required, use can be made of aqueous solutions containing more than one alkali hydroxide.

The solubility of the alkali metal hydroxide solutions depends on the alkali hydroxide used as solvent and the concentration of the solvent solution, as well as on the chemical composition and to a small extent on the average molecular weight of the polymers to be dissolved.

It will be appreciated that by conducting a few experiments it is possible in a simple manner to determine at what concentration of an aqueous alkali metal hydroxide solution the polymer concentration required for further processing can be obtained. Thus, it has been found that suitable alkali hydroxide concentrations are in the range of 6 to 10 percent by weight based on the weight of the solvent and that suitable polymer concentrations are in the range of 4 to 20 percent by weight, based on the total weight of the polymer-solvent solution.

For the purpose of carrying out the process of this invention, use may be made of the viscoses that are obtained by the known processes and that are used for the manufacture of widely varying types of rayon, e.g., the cotton or wool types, the Polynosic fiber types, and the thread types, which are spun in low or high-concentration acids. (Polynosic is a registered trademark of assignee corporation and is used to identify certain high modulus rayon staple fibers.)

Also suitable are the viscoses used for the manufacture of staple fibers or super tire yarn. Also, viscoses containing modifying agents or pigments can be used.

The spinning mass for producing the flame-resistant products of this invention is obtained by intimately mixing the selected viscose with the solution of the polyacyloxalamidrazone in alkali hydroxide. The two components are miscible in any ratio so that thread, fiber, film and the like extrudate blends having an arbitrary cellulose content can be made. Advantageously, the blends are stable. The stability of the spinning mass can be increased by using freshly produced viscoses having a high xanthate ratio.

The spinning mass is spun in baths usually employed in the manufacture of rayon. These baths may contain salts such as sodium, zinc, and/or magnesium sulfate in addition to an acid. The presence of the acid is of vital importance for the decomposition of the xanthate, but in the cases where zinc ions are contained in the bath, it also serves to prevent premature formation of metal compounds of the polyacyloxalamidrazone. Examples of spin bath compositions that can be utilized are: (1) 5.5% sulfuric acid, 15% sodium sulfate, 6% zinc sulfate at 50° C.; (2) 7% sulfuric acid, 17% sodium sulfate, 2% zinc sulfate at 60° C.; and (3) 4.5% sulfuric acid, 15% sodium sulfate, 6% zinc sulfate at 55° C.

With a spinning mass containing little viscose, it is also possible to employ a bath having a low acid content, use being made, for instance, of a bath composed of 20% ammonium chloride, and 2.1% sulfuric acid, at a temperature of 30° C.

After the blended threads, fibers, and films of polyacyloxalamidrazone and cellulose having left the spin bath, they are deacidified and, for instance, immersed in a bath in order to be treated with a solution of one or more compounds of the metals zinc, tin, cadmium, barium, strontium, calcium, antimony, and tantalum.

Suitable metal compounds are inorganic and organic salts and complex compounds of the metals zinc, tin, cadmium, barium, strontium, calcium, antimony, and tantalum.

Among the solutions suitable for reaction with polyacyloxalamidrazones are those of the above-noted metal compounds in water, dilute aqueous bases or acids, or in some organic solvents, for instance in methanol, ethanol, dimethyl sulfoxide, hexamethylphosphoric triamide, sulfolan, tetramethylurea, dimethyl formamide, pyridine and other amines, and in special cases also in chlorohydro-carbons, esters, ketones, and in carbon disulphide. The metal compounds can also be employed while dissolved in mixtures of these solvents. Use can, with advantage, be made of the following solutions:

Solution of tin compounds
e.g., aqueous tin (II) chloride solutions; and ethanolic tin (II) chloride solutions Solutions of zinc compounds
e.g., zinc chloride solutions in 2N ammonium hydroxide Solutions of cadmium compounds
e.g., cadmium sulphate solutions in 2N ammonium hydroxide Solutions of barium compounds
e.g., aqueous barium hydroxide solutions and aqueous ammonia barium chloride solutions Solutions of strontium compounds
e.g., aqueous strontium hydroxide solutions and aqueous ammonia strontium chloride solutions Solutions of calcium compounds
e.g., aqueous calcium hydroxide solutions and aqueous ammoniacal calcium chloride solutions Solutions of antimony compounds
e.g., antimony trichloride solutions in dimethyl formamide and tartaric acid antimony (III) chloride solutions in aqueous ammonia Solutions of tantalum compounds
e.g., tantalum (V) chloride solutions in dimethyl formamide Advantageously, use can be made of high concentrated solutions. However, also relatively low concentrated solutions can be used. For practical reasons, use is made of solutions produced at room temperature, although solutions produced at higher temperatures can also be utilized.

The treatment of the cellulose-polyacyloxalamidrazone threads, fibers, films, and like shaped products with the solutions of the metal compounds can take place, for instance, by immersing the shaped materials in a vessel containing the solution of the metal compounds. The fibers can, for instance, be immersed loose or as yarn in the form of skeins. Also, the cellulose-polyacyloxalamidrazone threads while wound on a bobbin can be exposed to the action of the metal compound in a suitable pressure washing.

In the treatment of the cellulose-polyacyloxalamidrazone threads, fiber, films or the like shaped products with the solutions of the metal compounds, the polyacyloxalamidrazone portion of the product reacts with the metal compound.

In this reaction, the polyacyloxalamidrazone chemically binds the corresponding metal, probably in complex form or as enolate.

After the treatment with the solutions of the metal compounds, the threads, fibers, films or the like products are thoroughly washed, for instance, with water, to which, if required, a 1% acetic acid solution or a weak ammoniacal solution has been added, followed by drying and conditioning.

The reaction speed and the amount of metal taken up depend on various factors. The rate at which the metal is taken up depends, inter alia, on the type of polyacyloxalamidrazone, the kind of metal, the metal compound, the strength of the solution, the solvent or the solvent mixture, the temperature and the pH value of the solution. In the course of the treatment, the threads, and the like, take up metal from the solution until the saturation limit of the respective polyacyloxalamidrazone has been reached. The most favorable method, particularly as far as the reaction time is concerned, for the manufacture of a cellulose-polyacyloxalamidrazone flame-resistant product can be readily determined by carrying out a series of simple experiments.

The flame-resistance of the polymeric products obtained by the process according to this invention is greater as they contain more metal.

The amount of metal taken up by a cellulose-polyacyloxalamidrazone-containing product, e.g., thread, fiber, or film, increases with the proportion of polyacyloxalamidrazone therein.

The threads, fibers, films, or the like products that contain the minimum metal percentage characteristic for each metal, and consequently a minimum polyacyloxalamidrazone content, even exhibit a flame-resistance in conformity with the DIN Method No. 53,906.

The highly or entirely flame-resistant threads, fibers, and the like have favorable textile properties.

In the process of this invention, it is particularly preferred to use threads and the like products containing 25 to 50 percent by weight of polyacyloxalamidrazone and 75 to 50 percent by weight of cellulose. Carrying out the process according to the invention so that such an amount of metal is taken up as corresponds to the saturation limit of the polyacyloxalamidrazone will result in obtaining products that are flame-resistant in conformity with DIN Method No. 53,906 and have very favorable textile properties.

For instance, the resulting threads may show a dry strength of 25 Rkm (Rkm = breaking length in km.), a dry elongation of 16 percent, a wet strength of 9Rkm, and a wet elongation of 19 percent. Such threads and fibers can without difficulty be processed into yarns, staple fiber yarn blends, woven and knitted fabrics, webs, etc.

The threads and fibers obtainable by the process according to the invention possess a pronounced color of their own depending on the metal contained in them, so that no further dyeing is required. However, the threads and fibers can still be after-dyed with the usual dyestuffs, such as disperse dyes, premetallized dyes, substantive dyes, acid and basic dyestuffs. Threads, fibers, and films that contain the metals zinc, tin, cadmium, barium, calcium, and strontium are organge to brown, those that contain antimony compounds are red, and those that contain tantalum are yellow-orange.

The process and products of this invention will be further understood by reference to the specific representative examples in this specification.

The metal compound utilized can be an inorganic or organic salt, including complex compounds of a metal selected from the group zinc, tin, cadmium, barium, strontium, calcium, antimony, and tantalum. These compounds should be water soluble or soluble in an organic solvent, which solvent is substantially inert to the polyacyloxalamidrazone and the regenerated cellulose filament composition. Suitable solvents containing the metal in solution for the treatment of such filaments are water and alkaline or acidic aqueous solutions in addition to organic solvents and mixtures thereof. The particular solvent medium selected is not a critical factor and a wide range is available, it being readily understood that the solubility of any particular metal compound selected in a given solvent will be either well-known or readily determinable.

The filaments continue to take up metal from the solution in the course of the treatment until a saturation limit of the particular polyacyloxalamidrazone has been reached. The most suitable method for preparing polyacyloxalamidrazone of a given metal content, and especially the determination of the necessary reaction time, can easily be obtained from a simple series of preliminary tests.

The metal-containing filaments produced by the process of the invention have an increasing flame-resistance with retention of increasing amounts of the metal. Filaments of this type which have a characteristic minimum metal content for each metal can be classed as non-inflammable according to DIN 53 906 (German Industrial Standards). In the case of polyterephthaloyloxalamidrazone filaments, for example, this minimum metal content is in the approximate range of 4 to 8 percent by weight. The minimum zinc content, for example, is approximately 5 percent by weight while the minimum tin content is approximately 3.5 percent by weight and the minimum calcium content is approximately 4 percent by weight. The minimum metal contents in polyfumaroyloxalamidrazone filaments are similar to those of polyterephthaloyloxalamidrazone. Filaments whose minimum metal content lies between about 3.5 to 8 percent by weight and whose content then extends up to the saturation limit of the polymer are not only "non-inflammable" according to DIN 53 906, but will also withstand prolonged action of the flames unharmed. The process according to the invention is therefore preferably used for producing filaments and fibers which have a metal content of about 3.5 percent to said saturation limit.

Representative examples illustrating the present invention follow. All parts are expressed in percent by weight unless otherwise specified.

EXAMPLE I

In this example, use was made of a viscose prepared, de-aerated, and filtered in the usual manner, i.e., by treating cellulose to form the soluble xanthate. This viscose contained 8.5% cellulose, 5.5% sodium hydroxide, 0.45% ethoxylated coconut oil amine, and was prepared using 34% $CS_2$, calculated on the cellulose. The xanthate ratio of this viscose was 0.45, and the viscosity 45 seconds (Ball fall method). A polyterephthaloyloxalamidrazone solution was prepared by homogeneously mixing 24.5 grams of polyterephthaloyloxalamidrazone, 18.5 grams of potassium hydroxide, and 266 grams of water at room temperature. After 2 hours, a clear solution had formed.

A spinning mass was prepared by mixing 610 grams of the viscose and 305 grams of the polyterephthaloyloxalamidrazone solution at room temperature with the aid of a laboratory stirrer. After about 1 hour, a homogeneous mixture was obtained. Subsequently, the homogeneous mixture was de-aerated in vacuo. After de-aeration, the viscosity of the mixture was 69 seconds (Ball fall method), and the xanthate ratio was 0.37.

The spinning mass was then formed into thread by extrusion through a spinneret. The spinneret had 60 holes each measuring 60 ω (micron) in diameter. The spin bath contained 5% sulfuric acid, 12.5% sodium sulfate, and 6% zinc sulfate. The spin bath temperature was 55° C. After the thread had left the spin bath, it was passed over a first godet at a rate of 30 meters per minute and subsequently through a hot second bath of 90° C. containing 2% sulfuric acid. The thread was wound on a perforated bobbin and deacidified and washed with permutite-treated water. Finally, the thread was finished and dried at 80° C. The thread thus obtained had a total denier of 130 d tex and containted 70 percent by weight of cellulose and 30 percent by weight of polytetephthaloyloxalamidrazone. In the dry state, the thread displayed a strength of 16.0 Rkm at an elongation of 20 percent and in the wet state, a strength of 6.3 Rkm at an elongation of 39.0 percent.

The dry thread was scoured in an aqueous solution of 3 grams per liter of Marseillese soap and immersed for one hour in a treating bath at 50° to 60° C. The treating bath was prepared by dissolving 150 grams of zinc chloride in 100 grams of water and by adding aqueous ammonium hydroxide in such an amount that the initially formed precipitate of zinc hydroxide was completely dissolved. Subsequently, the thread was washed successively with a 10% and a 1%-aqueous ammonium hydroxide solution and finally with permutite-treated water. After drying the thread contained 10% zinc with which it was chemically bound.

The thread was processed with a knitted fabric, which was tested for flame-resistance in accordance with the DIN Method No. 53,906. It was found to be flame resistant. (DIN refers to standard testing procedure of Deutsche Industrienorm.)

EXAMPLE II

From 282 grams of viscose and 750 grams of a solution of polyterephthaloyloxalamidrazone, a spinning mass was prepared and spun in the same way as described in Example I. The thread obtained showed a total denier of 115 d tex and in the dry state showed a strength of 15.2 Rkm, and an elongation of 11.2 percent. In the wet state, it had a strength of 6.8 Rkm, and an elongation of 14.5 percent. The thread contained 30 percent by weight of cellulose and 70 percent by weight of polyterephthaloyloxalamidrazone. The thread was immersed in a zinc-containing treating bath and further treated in the manner described in Example I. After it had been dried, the thread contained 25% zinc with which it was chemically bound. A knitted fabric made therefrom was found to be flame-resistant in conformity with the DIN Method No. 53,906.

EXAMPLE III

A thread as obtained in Example I was kept immersed in a bath at 60° C. made up of 125 grams of SnCl$_2$ .2H$_2$O in water.

The washed and dried thread contained 7% tin with which it was chemically bound. A knitted fabric made therefrom was found to be inflammable in conformity with DIN Method No. 53,906.

EXAMPLE IV

In this example, 610 grams of viscose of the type described in Example I was mixed with a solution of 24.5 grams of polyadipinoyloxalamidrazone, 24.7 grams of potassium hydroxide, and 226 grams of water, and subsequently de-aerated. In the manner described in Example I, this spinning mass was spun at 52° C. in a bath containing 7% sulfuric acid, 15% sodium sulfate and 6% zinc sulfate. The thread thus obtained had a total denier of 103 d tex and contained 70 percent by weight of cellulose and 30 percent by weight of polyadipinoyloxalamidrazone. In the dry state, it showed a strength of 8.6 Rkm at an elongation of 7.1 percent and in the wet state, a strength of 3.9 Rkm at an elongation of 6.1 percent. The treating bath was made up of a solution of 10 grams of zinc chloride in 100 grams of water, which solution was brought to a pH value of 12 by the addition of a strong ammonia solution. The thread was kept immersed in this bath at 20° C. for one hour, during which period it took up 2.5 percent by weight of zinc.

The thread was processed into a knitted fabric which proved to be highly flame-resistant.

EXAMPLE V

A thread of cellulose and polyadipinoyloxalamidrazone of the type described in Example IV was kept immersed in a 10 percent by weight aqueous solution of tin (II) chloride for one hour at 20° C. During this period, the thread took up 6.2 percent by weight of tin. A knitted fabric made therefrom provided to be highly flame-resistant.

EXAMPLE VI

This example further illustrates the synthetic polymers useful for preparing the flame-resistant products of this invention. In this experiment, 610 grams of the viscose described in Example I were mixed with a solution of 24.5 grams of poly-2,6-pyridinoyloxalamidrazone, 24.7 grams of potassium hydroxide and 226 grams of water. Then the mixture was de-aerated to form a spinning mass. In the manner described in Example I, this spinning mass was spun at 52° C. in a bath containing 9% sulfuric acid, 15% sodium sulfate, and 6% zinc sulfate. The resulting thread had a total denier of 107 d tex, and contained 70 percent by weight of cellulose and 30 percent by weight of poly-2,6-pyridinoyloxalamidrazone. In the dry state, the thread had a strength of 8.6 Rkm at an elongation of 5.4 percent, and in the wet state, a strength of 3.1 Rkm at an elongation of 13.8 percent. In a treating bath of the type described in Example IV, this thread was kept immersed for one hour at 20° C., during which period it took up 11.5 percent by weight of zinc.

The thread was processed into a knitted fabric, which was found to be flame-resistant in conformity with DIN Method No. 53,906.

EXAMPLE VII

A thread of cellulose and poly-2,6-pyridinoyloxalamidrazone as prepared in Example VI was kept immersed for one hour at 20° C. in a bath identical to that described in Example V. Upon evaluation, it was found that the thread had taken up 16.5 percent by weight of zinc. A knitted fabric made therefrom showed a flame-resistance in conformity with DIN Method No. 53,906.

EXAMPLE VIII

In this example, an untreated thread obtained as described in Example I was keot immersed in a saturated calcium hydroxide solution for 24 hours at 20° C. The thread took up 2.3 percent by weight of calcium. A knitted fabric made therefrom was found to be highly flame-resistant.

EXAMPLE IX

In this example, 29.9 g. polyisophthaloyloxalamidrazone were dissolved in a solution of 21.9 g. potassium hydroxide in 313.9 g. water. 625 g. of a viscose prepared in a conventional manner, containing 7.3% cellulose and 5.5% soda lye, were diluted with 56.5 g. of an aqueous potassium hydroxide solution. The polyacyloxalamidrazone solution was subsequently stirred into the dilute viscose solution. The resulting homogeneous mixture was deaerated and immediately spun by means of a spinneret with 60 holes of 60 microns each into a spinbath at 40° C. containing 4% sulfuric acid, 15% sodium sulfate and 0.2% of an ethoxylated coconut oil amine. After emerging from the first bath, the filaments passed through a second bath containing 2% sulfuric acid and likewise at a temperature of 40° C. The draw-off speed was 25 m/min., with a stretch of 5 percent being applied.

The resulting fibers exhibited the following textile properties: Denier: 274 dtex; tenacity, conditioned: 18 bkm; elongation, conditioned: 15.3 percent; wet strength: 6.2 Rkm, wet elongation: 35.1 percent.

The resulting fibers were made into a knitted tube on a circular knitting machine; the tube was submerged for 90 minutes at room temperature in a 20% zinc chloride solution adjusted with conc. ammonia to a pH of 11.0. The knitted material was subsequently washed and dried. It contained 9.2 percent by weight zinc and proved to be non-combustible.

EXAMPLE X

Utilizing the procedure described in Example IX, instead of 29.9 g. polyisophthaloyloxalamidrazone, use was made of 29.9 g. sebacinoyloxalamidrazone. Quantity ratio of lye and viscose, spinning conditions, further processing into a knitted tube as well as the treatment with the metal salt solution remained unchanged. The resulting knit contained 7.8 percent by weight zinc and was found to be flame-resistant.

EXAMPLE XI

In this example, 29.2 g. polyfumaroyloxalamidrazone were dissolved in a solution of 21.9 g. potassium hydroxide and 319.9 g. water. This solution was diluted with 350 ml. of an 8% aqueous potassium hydroxide solution and stirred into a viscose prepared in a conventional manner which contained 7.3% cellulose and 5.5% soda lye and was first diluted with 56.5 g. of a 12% aqueous potassium hydroxide solution. The resulting spinning mass was deaerated and spun under the conditions described in Example IX.

The resulting fibers exhibited the following textile properties: Denier: 212 dtex, tenacity, conditioned: 18.5 bkm; elongation, conditioned: 8.8 percent; wet strength: 5.2 Rkm; elongation, conditioned: 24.4 percent.

The resulting fibers were knitted to a tube under the conditions described in Example IX and subsequently treated with a zinc chloride solution. After treatment, the knitted material contained 11.4% zinc and proved to be non-combustible.

EXAMPLE XII

In this example, 29.9 g. polynaphthalinoyloxalamidrazone were dissolved in a solution of 21.9 g. potassium hydroxide and 319.9 g. water. 835 g. of a viscose prepared in a conventional manner, containing 7.3% cellulose and 5.5% soda lye were diluted with 56.5 g. of a 12% aqueous solution of potassium hydroxide. The polyacyloxalamidrazone solution was subsequently stirred into the dilute viscose solution. The resulting homogeneous spinning mass was spun and further processed under the conditions described in Example IX. The resulting knitted tube had absorbed 7.3% zinc and was found to be flame-resistant.

EXAMPLES XIII – XVII

For the following experiments, use was made of filaments of dtex 120 f. 60, a strength (dry) of 15.6 bkm, and an elongation (dry) of 10.6 percent, composed of 40 percent by weight of polyterephthaloyloxalamidrazine and 60 percent by weight of cellulose. The filaments were knitted to a tube which was submerged for 90 min, in a treatment bath at 25° C. The composition of the treatment bath, the color and the metal content of the resulting product as well as its combustion behavior are listed in Table I which follows.

TABLE I

| Example No. | Composition of the Treatment Bath | Metal Content | Color of the Product | Burning Behavior |
|---|---|---|---|---|
| XIII | 20% aqueous solution of $CdCl_2$ adjusted to pH 10.5 with $NH_4OH$ | 12.4 | Brown | Non-combustible |
| XIV | Saturated, aqueous solution of $Ba(OH)_2$ | 6.9 | Yellow | Flame-resistant/Repellent |
| XV | 20% aqueous solution of $SbCl_3$ in dimethyl-formamide | 4.9 | Red | Non-combustible |
| XVI | Saturated, aqueous solution of $Sr(OH)_2$ | 6.7 | Light Yellow | Flame-resistant/Repellent |

EXAMPLES XVIII – XIX

For the following examples, use was made of the knitted tubes described in Examples XVIII to XIX, which likewise has been submerged for 90 minutes in a treatment bath at 25° C. The composition of the treatment bath, the color and metal content, as well as the combustion behavior of the resulting products are listed in Table II which follows.

TABLE II

| Example No. | Composition of the Treatment Bath | Metal Content | Color of the Product | Burning Behavior |
|---|---|---|---|---|
| XVIII | Aqueous solution containing 10% by weight $ZnCl_2$ and 10% by weight $CdCl_2$ adjusted to pH 10.5 with $NH_4OH$ | 5.0 zinc<br>6.5 cadmium | Yellow | Non-combustible |
| XIX | Aqueous solution saturated with $Ca(OH)_2$, $Sr(OH)_2$, and $Ba(OH)_2$ | 2.6 calcium<br>1.1 strontium<br>4.4 barium | Yellow | Flame-resistant |

EXAMPLE XX

Polyisophthaloyloxalamidrazone was dissolved in 6% aqueous potassium hydroxide, filtered and mixed in a ratio of 1:16 with a viscose containing 7.3% cellulose, 5.5% sodium hydroxide, and 0.04% of an ethoxylated coconut oil amine. This spinning mass was spun from a slotted spinneret into a spinbath containing 4% sulfuric acid, 15% sodium sulfate, and 0.2% of an ethoxylated coconut oil amine. Temperature of the bath was 40° C. After emerging from this bath, the film was passed through a second bath containing 2% sulfuric acid and at a temperature of 85° – 90° C. Subsequently, the still wet film was passed through a third bath composed of 5% aqueous tin (II) chloride solution, washed to neutral reaction and then dried. The resulting films had a thickness of 20 microns, a weight of 30 g/m$^2$ and contained 20% tin. The breaking load was 3.30 kg. in a longitudinal direction and 1.75 kg. in a lateral direction measured on a strip 15 mm. wide, and was found to be non-combustible.

It is understood that the preceding representative examples can each be varied by one skilled in the art within the scope of this total specification disclosure to achieve substantially the same results with only a minimum of routine experimentation possible being required. For example, the particular polyoxyacylamidrazone selected is not critical nor is the speficie pH and weight percent thereof in the aqueous alkaline solution containing same.

It is significant in the practice of the present invention that the preparation of the flame retarded synthetic polymer in cellulose is one which is compatible with conventional viscose equipment, spin bath composition, regeneration bath composition, and conventional deacidification baths; the percentage components normally utilized in said baths remain the same. The process steps and conditions utilized are those of the conventional viscose rayon filament producing steps and conditions. The specific modification involved relates to the aqueous alkaline solution of polyacyloxalamidrazone and the metal salt or complex containing bath into which bath the spin filaments are immersed followed by routine washing and drying to produce a flame retarded product, such as spun filaments.

The polymers produced in the practice of this invention can be colored with conventional dyes, such as disperse dyes, metal dyes, substantive dyes, basic dyes, and acid dyes. Other conventional additives can be added as desired to achieve specific effects. These include, for example, conventional pigments and fillers.

The metal component of the modified polymer composition produced in the practice of this invention is one that is chemically bound, for example, in complex form such as an enolate. The exact nature of this complexing is not fully understood. However, said complexing may be taking place via carbonyl oxygen atoms and/or other active sites on the polymer. It is considered that a strong covalent type of bonding is used and not a weak ionic bonding. The proportion of metal complexed and retained can range from very samll quantities such as 0.1 percent by weight up to the saturation limit of the polyacyloxalamidrazone polymer; pre-iminently the part should not exceed 50 percent by weight.

The fibers produced according to the present invention are considered to be a novel type of fiber. They are made from a fiber mass consisting of a homogeneous mixture of cellulose and the synthetic polymer, polyacyloxalamidrazone. The fiber mass can contain any desired ratio of cellulose and polyacyloxalamidrazone, since the system, cellulose/polyacyloxalamidrazone, has no miscibility gap. For the manufacture of the products according to the invention, fibers and films of mixtures of these two polymers are treated with a solution of one or more metal compounds, whereby the polyacyloxalamidrazone component of the fiber or of the film binds metal cations chemically. This leads to the formation of a complex, which is probably attributable to the dissociation of the hydrazide hydrogen atom (enolization) adjacent to the carboxyl group, as well as to the occupation of the metal coordination sphere by the free electron pairs of the ligand nitrogen atoms. The polyacyloxalamidrazone component is thus modified chemically by the treatment with the metal compound, whereby the flame-retardant characteristics are acquired. Consequently, the fibers and films according to the invention consist essentially of a completely homogeneous mixture of cellulose and a metal compound of a polyacyloxalamidrazone.

The polyacyloxalamidrazones required as the initial product in the practice of this invention can be obtained by the process described in U.S. Pat. No. 3,554,528. Suitable polyacyloxalamidrazones are obtained by reacting oxalic acid bisamidrazone with the dichlorides or dibromides of the following acids: Oxalic acid, adipic acid, sebacic acid, succinic acid, fumaric acid, glutaric acid, 1,4-cyclohexane dicarboxylic acid, terephthalic acid, isophthalic acid, naphthalene dicarboxylic acid, and p,p'-diphenyl ether dicarboxylic acid. The metal uptake is influenced by a series of parameters, but the process conditions especially suitable for the preparation of a specific polyacyloxalamidrazone-metal compound that is desired can easily be found through a simple test series. If all other parameters are kept constant, the quantity of metal which can be taken up by the polymer depends on the chemical composition of the polymer and on the metal salt involved. If the treatment time is the same, an increase of the concentration of metal salt in the treatment bath increases the metal uptake. The metal uptake can be related to the pH of the metal compound solution as the uptake increases with increasing pH value. The rate of metal uptake is greater for polymer material of a high degree of swelling. The swelling can be produced either by the solvent of the metal solution as such and/or by another swelling agent.

The preceding applies to all mentioned polyacyloxalamidrazones. The metal uptake is therefore fastest when the polymer to be treated is in a swelled state, when the treatment is applied in the alkaline range (which presupposes that the metal compound is soluble in the alkaline medium), and when the solution of the metal compound is hot and saturated. Other process conditions can be selected for economic reasons, e.g., treatment at room temperature, the use of metal salts or metal complexes in acid solutions (since these are less expensive), etc. For one skilled in the art, it is consequently easy to determine suitable process conditions for a desired metal content by means of a few tests, e.g., through variation of the treatment time. In the treatment with the solutions of metal salts or complex compounds, the polyacyloxalamidrazone reacts with the metal ions, leading to chelate formation. The cellulose remains unchanged.

The complex formation capability of polyacyloxalamidrazones is so pronounced that the metal ions are taken up quantitatively from the salt or complex solutions as long as the saturation limit is not reached yet. Hence, highly dilute solutions, e.g., solutions of 0.01 percent by weight, as well as saturated solutions of the metal salts and complex compounds can be used. Temperature has very little influence, hence the treatment can be carried out in a low temperature range, e.g., 0° C., up to the boiling point of the solution. The pH range of the salt or complex salt solution utilized can be from pH 0 to 14 as a function of the used cation. The spinning mass is molded in the conventional manner, by using conventional spinnerets.

What is claimed is:

1. Process for the manufacture of flame-resistant polymer product containing synthetic and cellulosic polymer as the essential polymer components, which process comprises processing into a shaped product a homogeneous mixture of viscose and an aqueous alkaline solution of a polyacyloxalamidrazone of the formula:

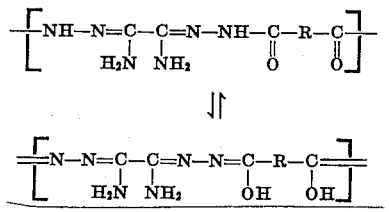

wherein R represents an organic radical selected from the group consisting of straight-chain radicals, branched saturated aliphatic radicals having from 2 to 12 carbon atoms, straight-chain and branched unsaturated aliphatic radicals having from 2 to 12 carbon atoms, cycloaliphatic radicals, araliphatic radicals, aromatic radicals having from 6 to 14 carbon atoms, and heterocyclic radicals having from 4 to 12 carbon atoms, and introducing it into a viscose regeneration bath, followed by deacidification and immersing the resulting polymer product in a treating bath in which bath said product is reacted with a solution of at least one salt or complex of a metal selected from the group consisting of zinc, tin, cadmium, barium, strontium, calcium, antimony, and tantalum, said metal or complex being taken up by said polyacyloxalamidrazone and thereafter washing and drying the resulting product.

2. The process of claim 1 in which the product used to react with the metal compound contains from 25 to 50 percent by weight of the said polyacyloxalamidrazone.

3. The process of claim 1 in which the polyacyloxalamidrazone is the reaction product of an acid halide of (1) a dicarboxylic acid having the formula:

$$X - CO - R\ CO - X$$

wherein X is a halogen radical selected from the group consisting of chloro and bromo radicals, and (2) oxalic acid bisamidrazone.

4. The process of claim 1 in which the polyacyloxalamidrazone is polyterephthaloyloxalamidrazone.

5. The process of claim 1 in which the polyacyloxalamidrazone is polyadipinoyloxalamidrazone.

6. The process of claim 1 in which the polyacyloxalamidrazone is poly-2,6-pyridinoyloxalamidrazone.

7. The process of claim 1 in which said mixture of polyacyloxalamidrazone and viscose is formed into filaments by extruding said mixture through a spinneret into a spin bath containing at least one salt selected from the group consisting of sodium sulfate, zinc sulfate, and magnesium sulfate.

8. The process of claim 7 in which the spin bath is acidic and the acid in said spin bath is sulfuric acid.

9. Process for the manufacture of flame-resistant polymer product in the form of threads, fibers, films, and the like products containing synthetic and cellulosic polymer as the essential polymer components, which process comprises processing into a shaped product a homogeneous mixture of viscose and an aqueous alkaline solution of a polyacyloxalamidrazone of the formula:

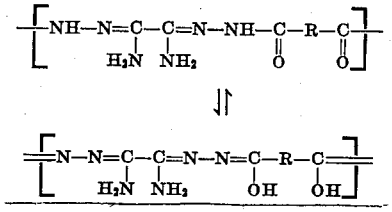

wherein R represents an organic radical selected from the group consisting of straight-chain radicals, branched saturated aliphatic radicals having from 2 to 12 carbon atoms, straight-chain and branched unsaturated aliphatic radicals having from 2 to 12 carbon atoms, cycloaliphatic radicals, araliphatic radicals, aromatic radicals having from 6 to 14 carbon atoms, and heterocyclic radicals having from 4 to 12 carbon atoms, and introducing it into a viscose regeneration bath, followed by deacidification and immersing the resulting polymer product in a treating bath in which bath said product is reacted with a solution of at least one salt or complex of a metal selected from the group consisting of zinc, tin, cadmium, barium, strontium, calcium, antimony, and tantalum, said metal or complex being taken up by said polyacyloxalamidrazone and thereafter washing and drying the resulting product.

10. Flame-resistant polymer product produced by the process of claim 9.

* * * * *

UNITED STATES PATENT OFFICE
CERTIFICATE OF CORRECTION

Patent No. 3,839,244            Dated October 1, 1974

Inventor(s) Erhard Siggel; Gerhard Meyer; Heinz Grotjahn; Helmut Iaegerlein; Hans-Dieter Rupp; Eckart Jacobs; M. Wallrabenstein It is certified that error appears in the above-identified patent and that said Letters Patent are hereby corrected as shown below:

On the abstract page insert

--- [30] Foreign Application Priority Data

May 2, 1969     Germany.....P1922336 ---

Column 8, line 44, change "keot" to --- kept ---.

Column 11, line 62, change "samll" to --- small ---.

Signed and sealed this 29th day of April 1975.

(SEAL)
Attest:

RUTH C. MASON
Attesting Officer

C. MARSHALL DANN
Commissioner of Patents
and Trademarks